United States Patent [19]
Epstein et al.

[11] Patent Number: 5,447,032
[45] Date of Patent: Sep. 5, 1995

[54] FLUORESCENT REFRIGERATION

[75] Inventors: Richard I. Epstein, Santa Fe; Bradley C. Edwards, Los Alamos; Melvin I. Buchwald; Timothy R. Gosnell, both of Santa Fe, all of N. Mex.

[73] Assignee: The Regents of the University of California, Alameda, Calif.

[21] Appl. No.: 230,182

[22] Filed: Apr. 19, 1994

[51] Int. Cl.$^6$ ............................................. F25B 21/00
[52] U.S. Cl. ....................................... 62/3.1; 62/37; 62/467
[58] Field of Search .......................... 62/3.1, 3.7, 467

[56] References Cited

U.S. PATENT DOCUMENTS 3,703,813  11/1972  Olevitch et al. ................. 62/3.1
4,628,695  12/1986  Berdahl .......................... 62/3.1

OTHER PUBLICATIONS

Shaul Yatsiv, "Anti-Stokes Fluorescence as a Cooling Process," in *Advances in Quantum Electronics*, Jay R. Singer, Ed., (Columbia University Press, 1961) pp. 200–213.

T. Kushida et al., "Optical Refrigeration in Nd-Doped Yttrium Aluminum Garnet," Phys. Rev. Letters 21, 1172 (1968).

*Primary Examiner*—William E. Wayner
*Attorney, Agent, or Firm*—Samuel M. Freund

[57] ABSTRACT

Fluorescent refrigeration is based on selective radiative pumping, using substantially monochromatic radiation, of quantum excitations which are then endothermically redistributed to higher energies. Ultimately, the populated energy levels radiatively deexcite emitting, on the average, more radiant energy than was initially absorbed. The material utilized to accomplish the cooling must have dimensions such that the exciting radiation is strongly absorbed, but the fluorescence may exit the material through a significantly smaller optical pathlength. Optical fibers and mirrored glasses and crystals provide this requirement.

14 Claims, 6 Drawing Sheets

FLUORESCENT REFRIGERATION

FIELD OF THE INVENTION

The present invention relates generally to refrigeration and, more particularly, to refrigeration utilizing anti-Stokes fluorescence resulting from nonradiative distribution of the energy levels in a working substance that has been excited using substantially monochromatic radiation, which removes heat therefrom. This invention was made with government support under Contract No. W-7405-ENG-36 awarded by the U.S. Department of Energy to The Regents of The University of California. The government has certain rights in the invention.

BACKGROUND OF THE INVENTION

Anti-Stokes fluorescent cooling has received theoretical attention for many years. For example, in "Anti-Stokes Fluorescence As A Cooling Process," by Shaul Yatsiv, *Advances In Quantum Electronics*, Jay R. Singer, Editor, Columbia University Press, 1961, pages 200–213, the author describes the three-level system in which short monochromatic light pulses are used to excite a particular electronic state of an ion. Relaxation processes between close-lying excited states transfer excitation from a particular state to other states of the same ion, which may then fluoresce to the ground state. Such processes can extract heat from the sample. Excitation from an isolated ground state to the lowest excited state is of particular interest, since it excludes Stokes-shifted emission lines. Additionally, Yatsiv defines an appropriate frequency width for the incident radiation to be such that excitations of other than the lowest excited state will be excluded. However, the cooling effect is small, and practicable devices have not been described. Moreover, Yatsiv states that multiple emission and reabsorption will not appreciably affect the final results. It can be shown that if the fluorescence is permitted to pass through a significant portion of the working substance, any cooling effect will be severely degraded. Finally, Yatsiv restricts the method to gadolinium ions as the sole rare earth usable for cooling.

The first experimental study of this type of refrigeration is reported in "Optical Refrigeration In Nd-Doped Yttrium Aluminum Garnet," by T. Kushida and J. E. Geusic, Phys. Rev. Letters 21, 1172 (1968). The authors do not report a net cooling, since it is believed that heating due to absorption by small trace impurities, probably $Dy^{3+}$, exceeded the cooling in the YAIG:Nd crystal. Additionally, $Nd^{3+}$ is a poor choice of dopant, since the energy levels of this ion having lower energy, are too close to the ground level. Therefore, there will be a significant number of nonradiative decays which heat the working substance. Kushida et al. also state that fluorescent cooling is capable of providing an 8° cooling range.

The development of fluorescent refrigeration having significant cooling effect would facilitate the widespread use of cryogenic electronic devices, both conventional and superconducting, and would greatly simplify the deployment of low-temperature, space-based instrumentation.

Accordingly, it is an object of the present invention to provide an apparatus utilizing fluorescent refrigeration for generating significant cooling.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the fluorescent refrigeration apparatus of this invention includes: means for generating substantially monochromatic electromagnetic energy, a working material having atoms with energy levels such that at most a small number of energy levels in an excited state thereof are directly excited by the electromagnetic energy from the ground energy level of the atoms, such that the unexcited levels in the excited state have an energy level spacing sufficiently small that thermal redistribution to higher energy levels may occur, and such that fluorescence to the ground state can occur from more energetic levels than those which were directly excited, means for directing the electromagnetic energy through the working material such that the optical path length of the electromagnetic radiation is large compared with the optical path length for the fluorescence in the working material, means for bringing the object to be cooled into thermal contact with the working material, and means for extracting the fluorescent radiation from the cold area.

It is preferred that the object to be cooled and the working material be located in a vacuum.

Benefits and advantages of fluorescent refrigerators include compact size and no moving parts, making them suitable for situations where low weight, small size, absence of vibrations, and long life are highly desirable. Additionally, since fluorescent refrigerators are powered by electromagnetic radiation, as opposed to electric wires, the object to be cooled can be substantially isolated from thermal conduction to surrounding bodies. In fact, components can be located in numerous geometries. With efficient diode lasers as the radiation source, fluorescent refrigerators are more efficient than refrigerators employing other techniques operating between 0.1 and 150 K.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION OF THE INVENTION

Figure 1:
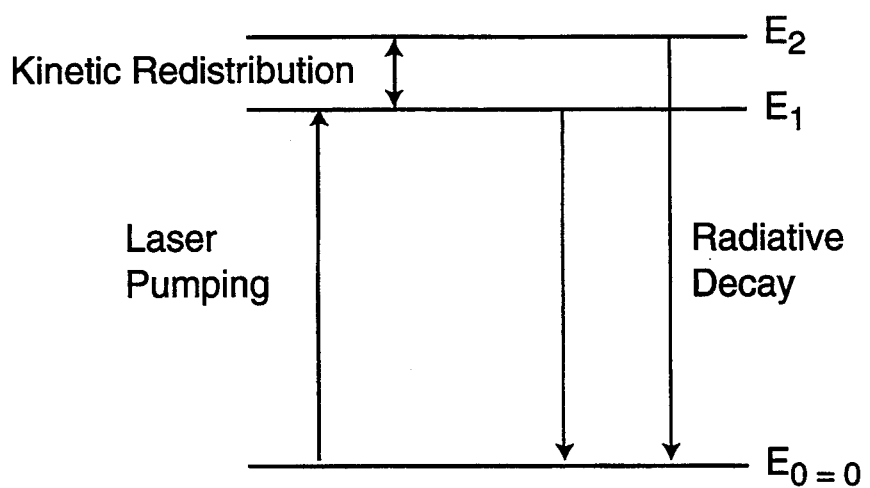
FIG. 1 shows an energy level diagram for a fluorescent cooling cycle employing a three-level fluorescent refrigerator.

The basic physical principals of fluorescent refrigeration are illustrated by the three-level refrigerator previously discussed by Yatsiv, supra, and shown in FIG. 1. The working substance of the refrigerator is assumed to have three energy levels $E_0=0$, $E_1$, and $E_2$, and to operate at a kinetic temperature $T_c$. This temperature describes the distribution of phonons in a solid working substance, but not necessarily the relative populations of the three energy levels. For the fluorescent refrigerator to function, the upper levels must have an energy spacing not more than a few times the characteristic energy of thermal excitation, i.e., $E_2-E_1 \equiv \Delta E < (3-6) \times kT_c$, where k is Boltzmann constant. With this spacing the kinetic or nonradiative redistribution rate, due to phonon interactions, can be rapid between levels 1 and 2, and the relative population of these levels quickly approaches thermal equilibrium at temperature $T_c$. The energy gap between the ground state and the upper levels, on the other hand, must be much greater than $kT_c$ so that nonradiative excitations from the ground state are strongly inhibited.

A laser tuned to energy $E_1$ excites atoms from the ground state to energy level $E_1$, thereby increasing the population of level 1 above its thermal equilibrium value. Endothermic, nonradiative redistribution processes bring the populations of levels 1 and 2 into thermal equilibrium by raising some of the $E_1$ excitations to $E_2$. This process extracts heat from the working substance. The excitations eventually decay emitting photons at both $E_1$ and $E_2$. The mean photon energy of the emitted radiation thus is higher than that of the laser radiation that drives the cooling cycle at energy $E_1$. The emitted radiation is absorbed by the surrounding walls which are at the ambient temperature $T_R$. Since the brightness temperature of the laser radiation is much higher than the ambient temperature, the cooling cycle is driven in the desired direction, even if the surroundings are much hotter than the working substance; that is, $T_R >> T_c$.

A low rate of nonradiative decays greatly diminishes the cooling efficiency. In a fluorescent refrigerator the nonradiative redistribution processes between levels 1 and 2 must maintain these levels nearly in thermal equilibrium with each other. The nonradiative redistribution processes between the upper levels and the ground state, on the other hand, are slow compared to the radiative decay rate. The populations of these states, then, are determined principally by the laser pumping rate and radiative decay. The laser radiation, which pumps the populations of levels 1 and 2, has a brightness temperature far higher than the ambient temperature $T_R$, and can pump the upper levels such that the emitted radiation is much brighter than $T_R$ over the bandwidth of the fluorescent lines. The high brightness of the fluorescent radiation ensures that the ambient radiation at temperature $T_R$ does not upset the fluorescent cooling process.

For the three-level refrigerator, the refrigeration cycle requires that the nonradiative redistribution rates between the ground state and the excited states are small compared to the radiative decay rates, and that the energy levels sufficiently close together to ensure the two upper levels to rapidly equilibrate at temperature $T_c$.

Figure 2:
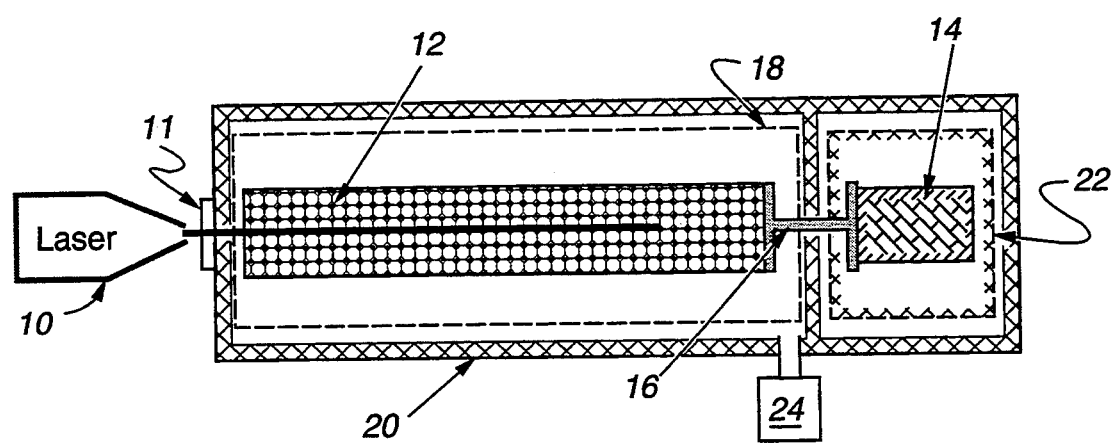
FIG. 2 is a schematic representation of a fluorescent refrigerator, showing the working material, the object to be cooled and its thermal connection to the working material, a laser excitation source, a vacuum chamber enclosing the working material and the object to be cooled, and a thermal shield.

Reference will now be made in detail to the present preferred embodiments of the invention, examples of which are illustrated in the accompanying drawings. Similar or identical structure in the Figures are represented by identical callouts. Turning now to FIG. 2, a schematic representation of one embodiment of a fluorescent cooling apparatus is shown. Laser 10 generates electromagnetic energy which is directed through window 11 into working substance 12. The wavelength of the electromagnetic radiation is chosen to match the excitation energy level system of working substance 12. Load 14 is in thermal contact with the working substance either by direct physical contact, or through thermal connection 16. Fluorescent light from the working substance passes through radiation shield 18, and is absorbed in the walls of container 20, which surrounds both working material 12 and load 14. Shield 18 also absorbs or reflects thermal radiation from the walls of container 20, thereby reducing the radiant heat load on the working substance. It is likewise important that load 14 is shielded both from the fluorescent radiation and from the incident excitation radiation from laser 10, since these radiations may be strongly absorbed thereby. In FIG. 2, load 14 is shown as being located in a separate chamber of container 20 from working material 12. However, shield 22 surrounding load 14 may assist in providing the required isolation, as well as shielding load 14 from thermal radiation from the walls of container 20 in a similar manner to that of shield 18. Additionally isolation from the fluorescence and laser radiation may be obtained by using mirrored faces on thermal link 16 and load 14. It is preferred that both the working substance and the object to be cooled are kept in an evacuated environment to reduce the thermal mass to be cooled and the conductivity to this mass. Container 20 is adapted to be evacuated by pump 22.

Figure 3:
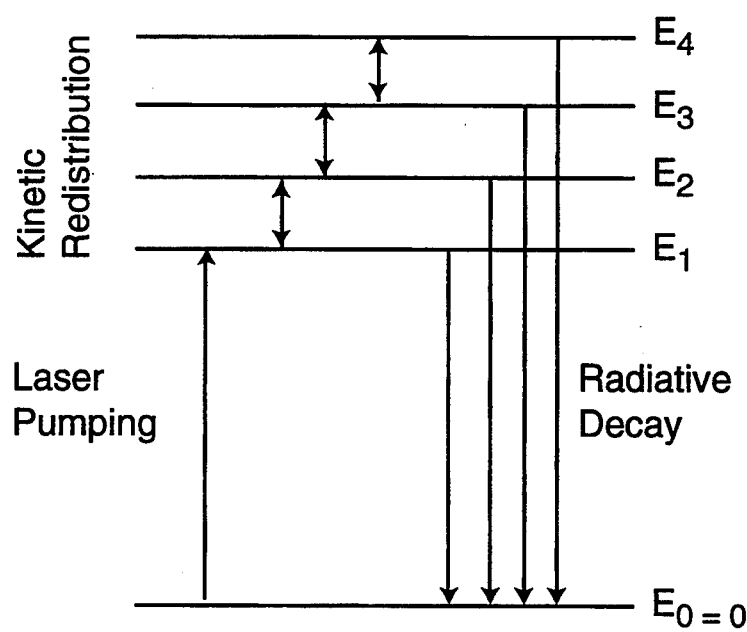
FIG. 3 shows an energy level diagram for a fluorescent cooling cycle employing a multilevel fluorescent refrigerator.

Efficiencies higher than those for the three-level fluorescent refrigerator are possible with more complex energy level structures. FIG. 3 illustrates the case where the working substance has many closely spaced excited energy levels separated from the ground state by a large energy gap. The closely spaced levels may also merge into a continuum. A large energy difference to the ground state is required to ensure that nonradiative redistribution between the upper levels and the ground state are rare, whereas the narrow spacings between adjacent excited levels allow these close levels to rapidly equilibrate at the kinetic temperature $T_c$ of the working substance. The cooling efficiency for this lo complex working substance can be quite high, limited by the second law of thermodynamics to unity.

Having generally described the present invention, the following specific example is given as a further illustration thereof.

EXAMPLE

For a practical fluorescent refrigerator, the working substance must be a transparent solid that absorbs and fluoresces at specific energies. Glasses and crystals doped with rare earth ions are good candidates. First, the low level excitations of the rare-earth ions couple weakly with the host material. That is, excitations are in the partially filled $4f$ shells, which are shielded from interacting with the host by the more extended, filled $5s$ and $5d$ shells. The weak coupling decreases the likelihood of nonradiative decays that would produce phonons in the host material. If the energy gaps are smaller than the maximum phonon energy, the phonon-assisted nonradiative redistribution times may be as small as $10^{-12}$ s. For energy gaps much larger than this, phonon-assisted deexcitation times may exceed 1 second. This variation of time scales with different energy gaps reflects the fact that deexcitations involving energies which are large compared to the maximum phonon energy require the simultaneous creation of many phonons, and higher-order processes are generally less efficient than lower-order processes. The division between shod and long relaxation times occurs at energy gaps of $\Delta E \sim (V_{sound}/c) a_m^{-1} \sim 500$ cm$^{-1}$, where $v_{sound} \sim 500$ m/s is the sound velocity of the host, c is the velocity of light, and $a_m \sim 3 \times 10^{-8}$ cm is a characteristic atomic dimension.

Many of the spacings between energy levels of triply ionized rare-earth atoms are so large that nonradiative decays should be slow. The spacings of these levels, which arise as a result of the orientation of the ion's angular momentum with respect to the crystal field, can be so small that their relative populations would quickly thermalize even at low kinetic temperatures, $T_c$.

The relative advantage of a crystal or a glass host and the choice of which ion or ions to use in a fluorescent refrigerator depend on the operating temperature range and the availability of efficient lasers. In glasses the spectral lines are inhomogeneously broadened and the levels of the J-manifolds merge to give a single, continuous band. This broadening is due to variations in the orientation of the guest ion with respect to the local lattice, and fluctuations in the number of nearest neighbors or imperfections or impurities in the host lattice. At relatively high temperatures ($T_c \geq 60K$), one can pump this broad transition in its far red wing. At these temperatures the energy redistribution and spectral migration are sufficiently rapid that the average fluorescence wavelength will be near band center and the cooling efficiency will be relatively large. At low temperatures ($10 \geq T_c \geq 0.1$ K), excitations have a stronger tendency to shift to lower energies, and it is necessary to pump on the red wing of a single narrow line or band. In this case one would want to use rare earth ions in a crystal so that each of the levels in a J-manifold is distinct and the lines are homogeneously broadened by the emission or absorption of phonons.

Fluorescent refrigeration need not be restricted to nonradiative redistribution processes within a single line or manifold. It may be possible to drive endothermic nonradiative redistribution processes between closely spaced levels of different rare-earth ions or between different J-manifolds in a single rare-earth ion species. For example, a fluorescent refrigeration scheme using two distinct ions could employ Nd$^{+3}$ together with Tb$^{+3}$, Pr$^{+3}$, or Ce$^{+3}$. If the first excited level of Nd$^{+3}$ were pumped, the excitations could then endothermically migrate to one or a combination of the other ions which have somewhat higher energy first excited states. This type of mixed-composition fluorescent refrigeration could give an efficiency of $N_{ws} \geq 15\%$. Another possible combination would be pumping Tm$^{+3}$ and having Er$^{+3}$ fluoresce. One advantage of using a mixed-composition fluorescence is that the relative abundances can be adjusted to optimize the cooling. The level that is being pumped could have a relatively small abundance, so that the spectral migration to the more abundant species could be greatly enhanced.

Cooling reactions between excitations in different J-manifolds is possible because in some ions the energy spacings between successive J-manifolds are similar, but not identical. For example, the energy gaps between the adjacent low lying levels of trivalent ions of Dy, Ho, and Er decrease with increasing level number. This anharmonic level spacing can be exploited in a fluorescent refrigerator. After laser excitation of a small fraction of the ions to a level $l > 1$, leaving the other ions in the ground state ($l=0$), nonradiative redistribution processes cause the excited ions to interact with ground state ions by $l-1$ processes which are slightly endothermic. The radiative decay of the $l=1$ excitations extracts a net energy $lE_1$.

Driving a cooling cycle by pumping the higher levels has important practical advantages besides improved efficiency. In particular, since there are several energy levels which can be pumped, a level can be chosen which lies in the spectral regions where efficient, inexpensive, reliable lasers are available.

Glasses and crystals doped with Yb$^{+3}$ ions have been examined as possible working substances for a fluorescent refrigerator. Ytterbium has only one low-lying excited state. The ground state manifold is a cluster of four separated energy levels, while the excited state is a group of three distinct levels near $10^4$ cm$^{-1}$. The required excitation wavelength is in the range where efficient diode lasers developed for optical fiber communication are available.

Figure 4:
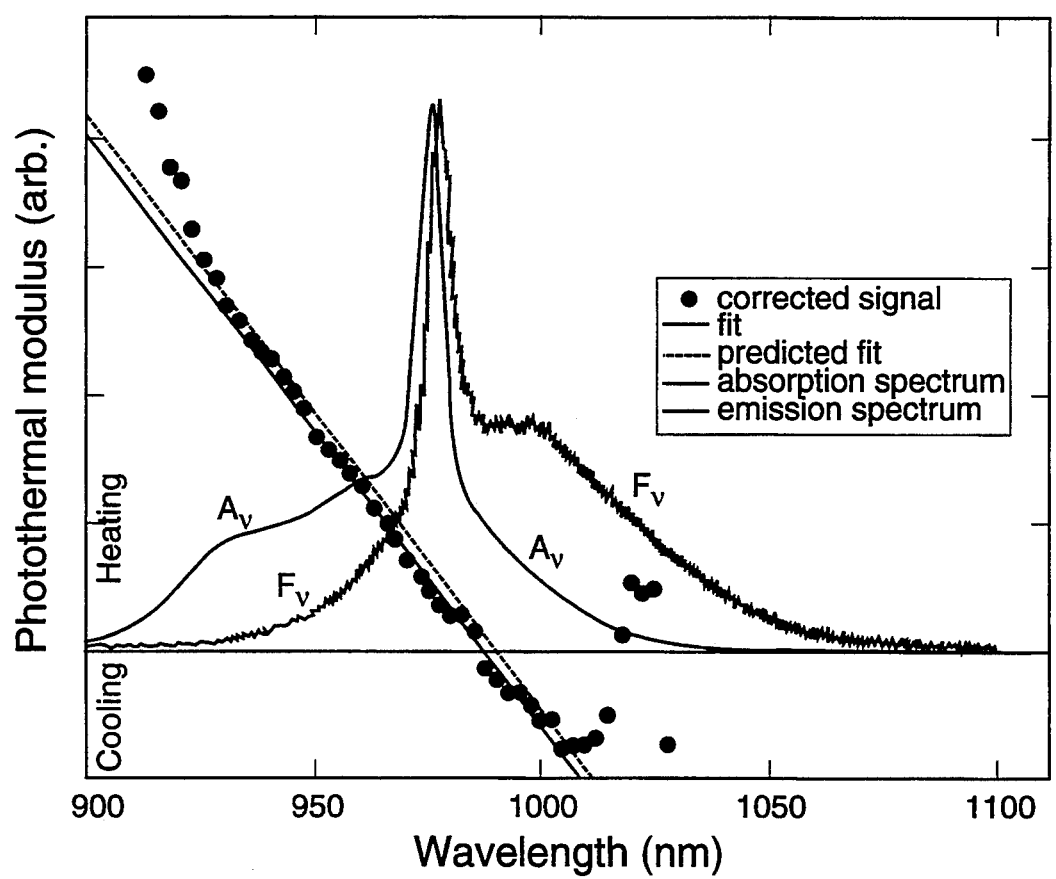
FIG. 4 shows the decay rate for the fluorescent emission for ytterbium-doped ZBLAN glass as a function of temperature.

To estimate whether the nonradiative decays are significant, fluorescent lifetimes were measured at different temperatures. Nonradiative decays occur through stimulated multiphonon emission, and their rate varies rapidly with the phonon density and temperature. When the nonradiative decay rate is comparable to the radiative ones, the fluorescent relaxation rate rises rapidly with increasing temperature. FIG. 4 illustrates that the fluorescent relaxation rate varies by only a few percent for temperatures ranging from 4 K to room temperature. The variations that are apparent in FIG. 4 most likely correspond to shifting populations of the J-levels at temperatures below $\sim 80$ K. This constancy suggests that fluorescent cooling measured at room temperature should persist down to at least liquid nitrogen temperatures. To directly measure fluorescent cooling and heating, photothermal deflection was utilized. This technique senses changes in the index of refraction of a sample due to minute changes in its temperature. A pump laser produces heating and cooling and a probe laser measures the changes in the sample. The pump laser was an argon-ion-pumped titanium sapphire laser. This laser is tunable from about 0.7 to 1.1 microns at powers between 0.5 and 2 watts. The pump laser passes through a chopper wheel and is focused into the sample. Interactions heat or cool the sample along the beam, and the temperature changes alter the index of refraction producing, in effect, a cylindrical lens. The light from the probe laser is adjusted to pass through the maximum gradient in this "lens" and is slightly deflected. The deflections are measured by a split silicon photo-diode and lock-in amplifier. The deflection signal depends on the transition lifetime, thermal characteristics of the sample, doping level, alignment, etc. The deflections from cooling will be inverted or 180° out of phase from those from heating.

To reduce any contamination of the signal by stray pump or other light, several filters and an aperture were used in front of the detector. The filters included a Corning 1-56, two 1-57s, and a red filter. Vibrations and air fluctuations were reduced through the use of optical tables and air baffles. A differential amplifier followed by another amplifier with high (100 Hz) and low (10 Hz) frequency rolloffs was used to process the signal. The chopper frequency was $\cong 25$ Hz.

Centimeter-size samples of pure ZBLAN, 0.3% Yb doped ZBLAN, and 2% Er-doped ZBLAN were examined. The pure ZBLAN glass gave no detectable signal as expected. The Er sample produced a large signal due to its strong nonradiative decays and was used to align the system. The Yb-doped samples gave clear evidence of cooling, as shown by the filled circles in FIG. 5 hereof which shows measurements obtained by the present inventors for the fluorescent spectrum $F_\nu$ of a sample of ZBLAN glass doped with 0.3 wt % $Yb^{+3}$ ions at 300 K. These circles give deflection modulus $\Delta$ which is the angular deflection of the probe beam divided by the absorptivity $A_\nu$ of the sample.

The mean energy of the fluorescent emission corresponds to a wavelength of $\sim 988$ nm, independent of the pump wavelength. The absorption spectrum $A_\nu$ is also shown in this Figure. The absorptivity falls off rapidly at long wavelengths, but is still sizable on the red side of 988 nm. It is possible to excite this sample at wavelengths longer than $\sim 1040$ nm, which would correspond to an efficiency of $>5\%$ if there were no nonradiative decays.

Figure 5:
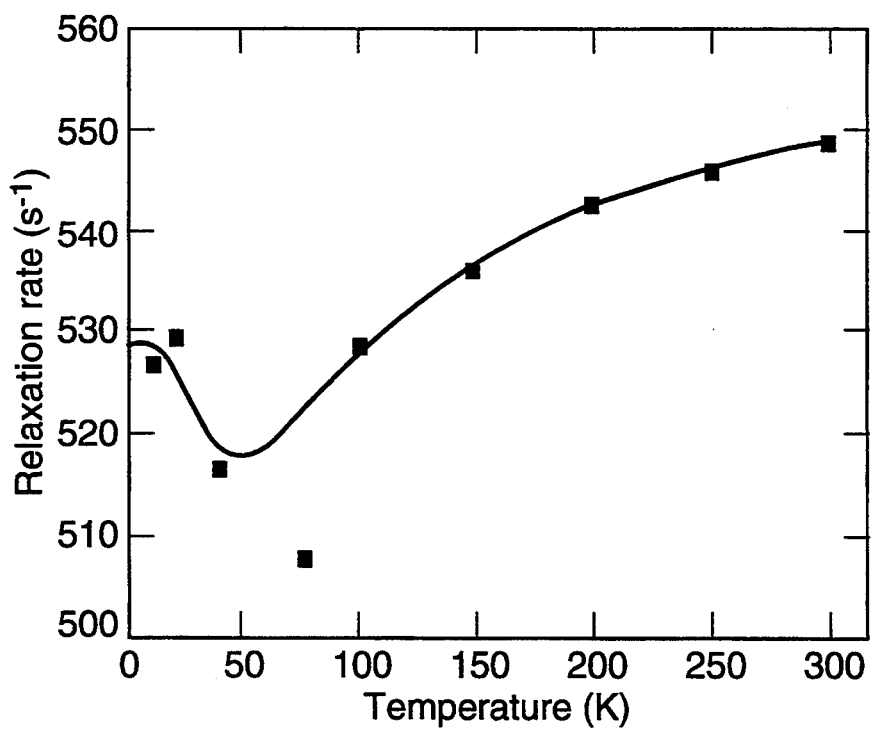
FIG. 5 shows the measured properties of ZBLAN glass doped with trivalent ytterbium ions.

The data in FIG. 5 can be understood by considering the fate of radiation absorbed by the sample. The laser power that is absorbed, $P_A$, is proportional to $A_\nu$. A fraction $t_{rad}/(t_{rad}+t_{nr})$ of the absorbed power is converted into heat by nonradiative deexcitations, where $t_{rad}$ and $t_{nr}$ are the radiative and nonradiative lifetimes. The remaining fraction of the power, $t_{nr}/(t_{rad}+t_{nr})$, is reemitted. It can be shown that the deflection modulus varies linearly with phonon energy (inversely with wavelength) and crosses zero at wave number $\nu_F t_{nr}/(t_{rad}+t_{nr})$. The dotted line in FIG. 5 presents the theoretical predictions in the absence of nonradiative decays. The solid line is the best fit to the reliable parts of the data (in the far red and blue, the data become noisy). The observations are consistent with the expected fluorescent cooling and heating if nonradiative decay was negligible.

Figure 6:
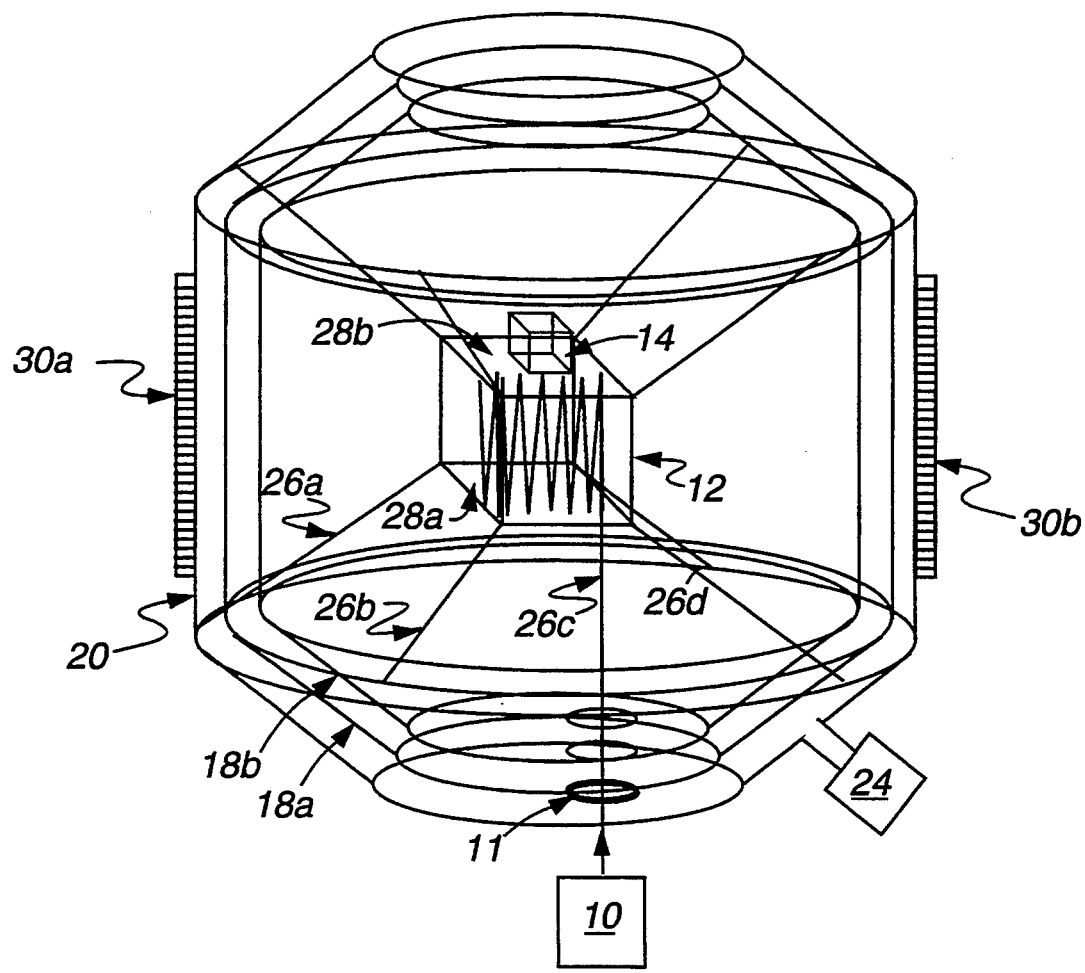
FIG. 6 shows a schematic representation of the apparatus of the present invention illustrating the use of a crystalline working material having dielectric coated and silvered opposing faces.

Another embodiment of the present invention is illustrated in FIG. 6. In this device, two faces of the working substance 12 are mirrored with a low-loss combination of dielectric and metal coatings. The object to be cooled 14, is shown to be in direct contact with working substance 12, both materials being suspended from Kevlar fibers 26a-d. Electromagnetic radiation from diode laser 10 enters chamber 20 through window 11. Small apertures in shields 18a,b permit the radiation to impinge on crystal 12. A small aperture in one of the mirrored faces 28a,b allows the light to enter the crystal, in which it is repeatedly reflected until absorbed. Complete internal reflection prevents the laser light from leaking out the ends. The isotropically emitted fluorescent radiation readily escapes through the nonmirrored faces, passes through shielding, and is absorbed and thermalized by the shell of the apparatus. It is important to point out that for efficient cooling, the optical pathlength of the fluorescent radiation should be small in order to avoid heating by absorption thereof in the working substance, while the pathlength for the excitation radiation should be as long as possible. In addition to the multiple reflection in doped glasses or crystalline materials, doped optical fibers may also be utilized. If the excitation radiation is introduced into one end thereof, internal reflections will prevent its escape, while the isotropically emitted fluorescence may readily exit through the walls. Most of the thermal radiation from container 20 is stopped by shielding layers 18a,b, so that only a small amount is absorbed by the working substance. Acrylic shields have been found to be useful in the 1 μm region. Container 20 may be kept at room temperature or can be cooled by thermoelectric coolers 30a,b.

The flux of emitted fluorescent radiation at any given wavelength is limited by radiation transfer. The maximum fluorescent flux increases with the thickness of the working substance until reabsorption becomes significant. The flux then saturates at the thermodynamic limit. Quantitatively, the maximum flux is set by the black-body flux at the population temperature T for the transition between levels. The population temperature is determined by the ratio of the populations of the upper and lower states. It can be shown that a refrigerator that produces $\sim 1$ W of cooling would not have to be larger than a few cm across. This type of cooler is significantly more compact than commercial devices of comparable power. A mW cooling device for use with electronic components would have linear dimensions on the order of 1 mm and be integrated directly into the circuit.

The working materials identified, once commercialized, would be relatively inexpensive, and the cost of a fluorescent refrigerator would be dominated by the cost of the driving lasers. Currently diode lasers are available for $\sim \$20$ per W of cw laser power so that each W of cooling would cost $\sim \$20$/efficiency. If the efficiency were about half the maximum efficiency for a Yb device, equation 2.1, then $\eta_{ws} \sim T_c/4000$ K, and the fluorescent refrigerators would cost $\sim \$80,000/T_c$ per W of cooling. This cost is much less than that of currently available coolers for space applications operating below 80 K. The marginal cost of manufacturing diode lasers is far below the $\sim \$20$ per W used in this estimate, and the cost for a specific wavelength laser would drop substantially if it were produced in large numbers.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for removing heat from an object to be cooled, which comprises in combination:

a. means for generating substantially monochromatic electromagnetic energy;
b. a working material having atoms with energy levels such that at most a small number of energy levels in an excited state thereof are directly excited by the substantially monochromatic electromagnetic energy from the ground energy level of the atoms, such that the levels in the excited state which are not directly excited have an energy spacing such that they may be thermally redistributed, and such that fluorescence to the ground state can preferentially occur from the thermally equilibrated energy levels, whereby the average photon energy for fluorescence to the ground energy level is greater than the energy of the substantially monochromatic electromagnetic energy;
c. means for directing the substantially monochromatic electromagnetic energy through said working material such that the optical pathlength of the substantially monochromatic electromagnetic radiation is large compared with the optical pathlength for the fluorescence in said working material;
d. means for bringing the object to be cooled into thermal contact with said working material; and
e. means for thermally isolating the object to be cooled and said working material from external radiative heat sources.

2. The apparatus as described in claim 1, wherein the object to be cooled is surrounded by a thermal insulating shield.

3. The apparatus as described in claim 1, wherein said working substance is surrounded by a shield which is transparent to the fluorescence, but opaque to background radiation.

4. The apparatus as described in claim 1, wherein said means for generating substantially monochromatic radiation includes laser means.

5. The apparatus as described in claim 4, wherein said working material includes optical fibers doped with rare-earth ions, and wherein the substantially monochromatic radiation is introduced into one end thereof.

6. The apparatus as described in claim 5, wherein said laser means includes an argon-ion-pumped titanium sapphire laser, and said rare-earth ions include ytterbium ions.

7. The apparatus as described in claim 4, wherein said working material includes materials doped with rare-earth ions, said crystalline material being reflective coated such that the substantially monochromatic radiation is multiply reflected therethrough.

8. The apparatus as described in claim 7, wherein said laser means includes an argon-ion-pumped titanium sapphire laser, and said rare-earth ions include ytterbium ions.

9. The apparatus as described in claim 1, wherein said means for thermally isolating said working material and the object to be cooled from external radiative heat sources includes means for evacuating the region surrounding said working material and the object to be cooled.

10. The apparatus as described in claim 3, wherein said shield is fabricated from acrylic.

11. The apparatus as described in claim 5, wherein said laser means includes diode lasers.

12. The apparatus as described in claim 5, wherein said laser means includes fiber lasers.

13. The apparatus as described in claim 7, wherein said laser means includes diode lasers.

14. The apparatus as described in claim 7, wherein said laser means includes fiber lasers.

* * * * *